US011164255B1

(12) United States Patent
Yu et al.

(10) Patent No.: US 11,164,255 B1
(45) Date of Patent: Nov. 2, 2021

(54) METHODS AND SYSTEMS FOR GENERATING A FINANCIAL MARKET SNAPSHOT

(71) Applicant: XIGNITE, INC., San Mateo, CA (US)

(72) Inventors: Qin Yu, Santa Clara, CA (US); Homi Chothia, San Ramon, CA (US); Albert Shih-Po Chang, Palo Alto, CA (US)

(73) Assignee: XIGNITE, INC., San Mateo, CA (US)

( * ) Notice: Subject to any disclaimer, the term of this patent is extended or adjusted under 35 U.S.C. 154(b) by 179 days.

(21) Appl. No.: 16/035,253

(22) Filed: Jul. 13, 2018

(51) Int. Cl.
*G06Q 40/00* (2012.01)
*G06Q 40/06* (2012.01)
*G06Q 40/04* (2012.01)
*G06Q 30/02* (2012.01)

(52) U.S. Cl.
CPC ......... *G06Q 40/06* (2013.01); *G06Q 30/0201* (2013.01); *G06Q 40/04* (2013.01)

(58) Field of Classification Search
CPC .................................................... G06F 17/00
See application file for complete search history.

(56) References Cited

U.S. PATENT DOCUMENTS

| 7,783,615 | B1 | 8/2010 | Compton |
| 7,801,784 | B2 | 9/2010 | Bandman |
| 7,974,909 | B1 | 7/2011 | Tresenriter |
| 9,406,196 | B2 | 8/2016 | Asher |
| 2002/0026321 | A1* | 2/2002 | Faris ................. A63F 13/12 705/1.1 |
| 2002/0055899 | A1 | 5/2002 | Williams |
| 2002/0091621 | A1 | 7/2002 | Conklin |
| 2005/0256797 | A1 | 11/2005 | Tyulyaev |
| 2007/0050273 | A1 | 3/2007 | Burke |
| 2009/0182683 | A1 | 7/2009 | Taylor |
| 2012/0041891 | A1 | 2/2012 | Babel |
| 2016/0335361 | A1* | 11/2016 | Teodorescu ........... G06F 3/0605 |

OTHER PUBLICATIONS

U.S. Appl. No. 15/370,982, filed Dec. 6, 2016, Pending.
U.S. Appl. No. 16/544,254, filed Aug. 19, 2019, Pending.
U.S. Appl. No. 16/776,853, filed Jan. 30, 2020, Pending.
U.S. Appl. No. 15/370,982.

(Continued)

*Primary Examiner* — Bennett M Sigmond
*Assistant Examiner* — Marla Hudson
(74) *Attorney, Agent, or Firm* — DLA Piper LLP (US)

(57) ABSTRACT

Methods and systems for automatically generating a financial market snapshot are disclosed. A plurality of financial market data elements from a plurality of sources are received. Respective workflows selected from a plurality of workflows in the at least one memory are determined, each respective workflow being selected for processing a separate one of the plurality of financial market data elements. A plurality of dependencies linking the respective workflows with one another are determined, each dependency comprising at least one dependency condition. In response to at least one dependency condition being met, at least one of the respective workflows is linked to the at least one dependency for which the at least one dependency condition is met. The financial market snapshot is generated as a result of the processing of the at least one respective workflow.

20 Claims, 4 Drawing Sheets

(56) References Cited

OTHER PUBLICATIONS

The UTP Plan Trade Data Feed (UTDF) Direct Subscriber Interface Specification, Version 14.4, NASDAQ Market Technology, Printed from www.utpplan.com/DOC/utdfspecification.pdf, 96 Pages, (Nov. 2015).
US Equities/Options Multicast PITCH Specification, Version 2.20.4, Bats Global Markets, Inc., Printed from www.batstrading.com/resources/.../BATS_MC_PITCH_Specification.pdf, 68 Pages, (Jan. 29, 2014).
US Equities TOP Specification, Version 1.3.0, CBOE, Printed from cdn.batstrading.com/resources/membership/BATS_TOP_Specification.pdf, 22 Pages, (Feb. 19, 2016).
U.S. Appl. No. 16/544,254.
U.S. Appl. No. 16/776,853.

* cited by examiner

| Date | Symbol | Exchange | Currency | Open | High | Low | Last | Volume | SplitRatio | CashDivide | DividendCurrency |
|---|---|---|---|---|---|---|---|---|---|---|---|
| 4/25/2017 | A | XNYS | USD | 54.75 | 55.19 | 54.51 | 54.81 | 2178472 | 0 | 0 | 0 |
| 4/25/2017 | AA | XNYS | USD | 34.23 | 36.55 | 34.23 | 36.49 | 11158922 | 0 | 0 | 0 |
| 4/25/2017 | AAC | XNYS | USD | 7.21 | 7.39 | 7.03 | 7.06 | 65054 | 0 | 0 | 0 |
| 4/25/2017 | AGN/PA | XNYS | USD | 847.56 | 852 | 846.88 | 850.09 | 5012 | 0 | 0 | 0 |
| 4/25/2017 | AGO | XNYS | USD | 38.63 | 38.96 | 38.61 | 38.79 | 756385 | 0 | 0 | 0 |
| 4/25/2017 | AHP | XNYS | USD | 10.73 | 11.045 | 10.59 | 11 | 323934 | 0 | 0 | 0 |
| 4/25/2017 | AHP/PB | XNYS | USD | 20 | 20.1 | 19.87 | 20.09 | 35900 | 0 | 0 | 0 |
| 4/25/2017 | AHT | XNYS | USD | 6.45 | 6.56 | 6.39 | 6.55 | 655579 | 0 | 0 | 0 |
| 4/25/2017 | AI | XNYS | USD | 14.5 | 14.63 | 14.37 | 14.49 | 450375 | 0 | 0 | 0 |
| 4/25/2017 | ALL | XNYS | USD | 80.75 | 81.38 | 80.75 | 81.22 | 1693392 | 0 | 0 | 0 |
| 4/25/2017 | ALL/PC | XNYS | USD | 27.25 | 27.3101 | 27.25 | 27.3 | 74683 | 0 | 0 | 0 |
| 4/25/2017 | ALLE | XNYS | USD | 78.65 | 79.09 | 78.32 | 78.75 | 400132 | 0 | 0 | 0 |
| 4/25/2017 | ALLY | XNYS | USD | 20.6 | 20.71 | 20.49 | 20.7 | 4119783 | 0 | 0 | 0 |
| 4/25/2017 | BRK/A | XNYS | USD | 250125 | 252000 | 250125 | 251231 | 362 | 0 | 0 | 0 |
| 4/25/2017 | BRK/B | XNYS | USD | 166.92 | 167.96 | 166.6 | 167.53 | 4252482 | 0 | 0 | 0 |
| 4/25/2017 | BRO | XNYS | USD | 43.32 | 43.45 | 43.05 | 43.08 | 440071 | 0 | 0 | 0 |
| 4/25/2017 | Y | XNYS | USD | 614.4 | 615.79 | 612.26 | 613.1 | 20647 | 0 | 0 | 0 |
| 4/25/2017 | YELP | XNYS | USD | 33.97 | 34.55 | 33.82 | 34.21 | 1278384 | 0 | 0 | 0 |
| 4/25/2017 | YEXT | XNYS | USD | 13.8 | 13.8368 | 13.66 | 13.72 | 185920 | 0 | 0 | 0 |
| 4/25/2017 | YGE | XNYS | USD | 2.68 | 2.69 | 2.61 | 2.62 | 91587 | 0 | 0 | 0 |
| 4/25/2017 | YPF | XNYS | USD | 25.49 | 25.69 | 25.16 | 25.55 | 1044911 | 0 | 0 | 0 |
| 4/25/2017 | YRD | XNYS | USD | 24.33 | 25 | 24.25 | 24.64 | 232111 | 0 | 0 | 0 |
| 4/25/2017 | YUM | XNYS | USD | 65.8 | 66.49 | 65.72 | 65.98 | 3395799 | 0 | 0 | 0 |
| 4/25/2017 | YUMC | XNYS | USD | 33.42 | 33.74 | 33.18 | 33.7 | 3274012 | 0 | 0 | 0 |
| 4/25/2017 | YUME | XNYS | USD | 4.14 | 4.19 | 4.14 | 4.16 | 28111 | 0 | 0 | 0 |
| 4/25/2017 | ZAYO | XNYS | USD | 34.48 | 35.14 | 34.38 | 35.05 | 2656454 | 0 | 0 | 0 |
| 4/25/2017 | ZB/PF | XNYS | USD | 25.47 | 25.47 | 25.45 | 25.47 | 5542 | 0 | 0 | 0 |
| 4/25/2017 | ZBH | XNYS | USD | 123.4 | 124.76 | 123.01 | 124.49 | 1074983 | 0 | 0 | 0 |
| 4/25/2017 | ZEN | XNYS | USD | 28.8 | 28.98 | 28.6 | 28.68 | 967781 | 0 | 0 | 0 |
| 4/25/2017 | ZF | XNYS | USD | 11.69 | 11.72 | 11.63 | 11.72 | 87967 | 0 | 0 | 0 |
| 4/25/2017 | ZNH | XNYS | USD | 34.19 | 34.19 | 33.86 | 33.87 | 16293 | 0 | 0 | 0 |
| 4/25/2017 | ZOES | XNYS | USD | 17.58 | 18.24 | 17.48 | 18.09 | 446910 | 0 | 0 | 0 |
| 4/25/2017 | ZPIN | XNYS | USD | 17.92 | 17.95 | 17.86 | 17.89 | 51921 | 0 | 0 | 0 |
| 4/25/2017 | ZTO | XNYS | USD | 13.08 | 13.24 | 12.97 | 13.23 | 1474569 | 0 | 0 | 0 |
| 4/25/2017 | ZTR | XNYS | USD | 12.16 | 12.24 | 12.1 | 12.22 | 158582 | 0 | 0 | 0 |
| 4/25/2017 | ZTS | XNYS | USD | 55.12 | 55.16 | 54.7 | 55.12 | 4343827 | 0 | 0 | 0 |
| 4/25/2017 | ZX | XNYS | USD | 1.55 | 1.58 | 1.54 | 1.54 | 2755 | 0 | 0 | 0 |

FIGURE 4

METHODS AND SYSTEMS FOR GENERATING A FINANCIAL MARKET SNAPSHOT

BRIEF DESCRIPTION OF DRAWINGS

FIG. 4 illustrates a financial market data snapshot, according to an embodiment of the invention.

DETAILED DESCRIPTION OF EMBODIMENTS OF THE INVENTION

Figure 1:
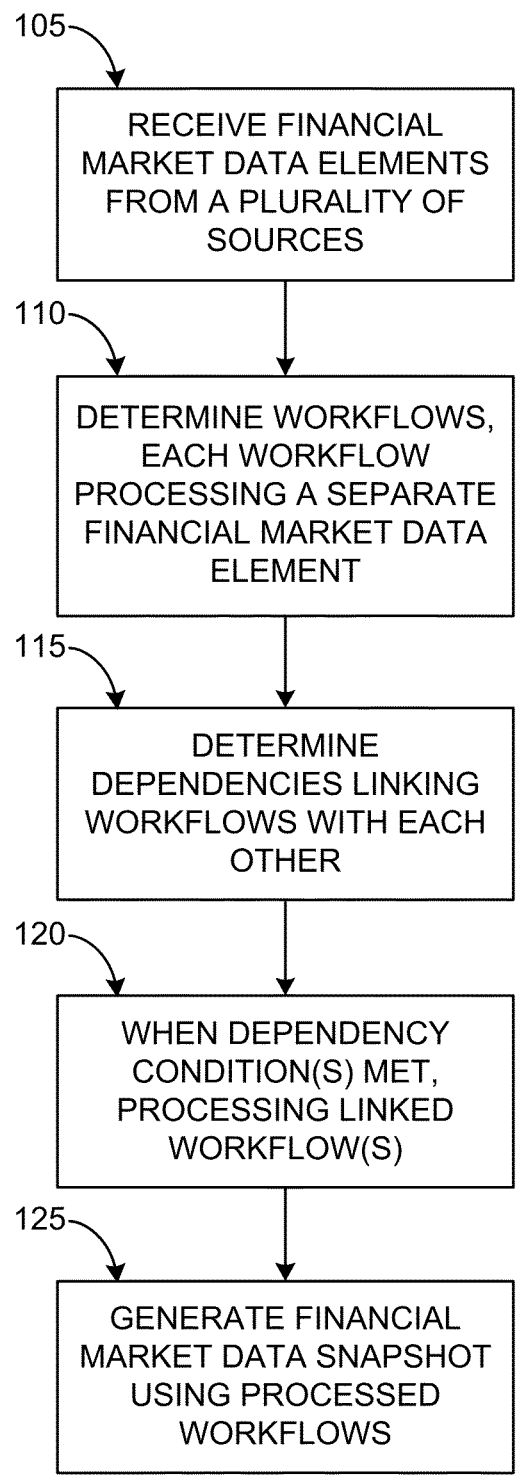
FIG. 1 illustrates a method for generating a financial market data snapshot, according to an embodiment of the invention.

Methods and systems are provided for generating an end-of-day snapshot that may provide consistent information for financial market data from multiple data sources. An end-of-day snapshot may comprise a stock quote, which may combine data from several sources and/or may include derived values based on data from multiple sources. Example types of data that may be used may comprise:

- Ticker symbol (i.e., MSFT)—May comprise the identifier that an exchange issues and uses for a traded security.
- Other industry identifiers—May comprise identifiers that other data vendors have introduced to standardize across exchanges. For example, ISIN and CUSIP from Standard & Poor's, SEDOL from the London Stock Exchange, Valoren from SIX Financial Information.
- Closing price—May comprise the official closing price that an exchange publishes.
- Sector and industry classification—May comprise multiple data vendors, such as FactSet and GICS, which categorize companies to describe the line of business.
- Revenue—May comprise revenue metrics that governments (e.g., US) companies report to the SEC with their quarterly and annual financial statements.
- Price-to-earnings—May comprise a derived value based on the latest trade price and earnings from the most recent financial statement.
- Corporate actions—May comprise events that affect the valuation of a security and typically require adjusting historical prices. For example, stock splits, spin-offs, and dividends.

Generating a snapshot of end-of-day prices for some or all securities traded on an exchange may require ingesting data from multiple data sources as well as changes that should be made to the snapshot based on the data received from the multiple data sources (referred to as "dependencies"). For example:

- Corporate actions—Can result in changes to a security's ticker symbol and/or other industry identifiers. Can generate an adjustment factor for historical prices prior to this date.
- Earnings announcement—Can update financial statement metrics such as revenue and earnings. May be required for derived values such as price-to-earnings.
- Sector and industry classifications—May reflect the most recent classification for each security.
- Closing price—May be the last trade executed that day, but can be revised by an exchange after the trading session ended. May be required for derived values such as price-to-earnings.

In some embodiments, the system can automate the generation of financial market data snapshots by efficiently processing market data from multiple sources using a rules engine that represents the interdependencies between different data sets. The system may use the concept of a workflow (e.g., a multi-step workflow in some embodiments) to capture dependencies and automatically trigger a process when these dependencies are fulfilled. Consistent snapshots in time for financial market data may be generated using one or more of the following concepts:

- Rules-driven workflow configuration—A central repository can be maintained for declaring the conditions that must be met for each work item. Each workflow can comprise one or more work items.
- Multiple dependency constraints—One or more conditions that must be satisfied can be defined for each work item. These conditions may comprise: the completion of another work item, the existence of a file, or a combination of completed work items and files.
- Time-based conditions—Time-based conditions can be defined for a work item. A time-based condition may be specific for a time zone and it can be specified whether or not to adjust for daylight savings time. Time-based conditions can specify a time after which a work item can begin, as well as a time after which a work item cannot begin. A work item may have time-based conditions, dependency constraints, or both.
- Automated process invocation—The processing of work items may be automatically invoked when all dependency constraints and time-based conditions are met.
- Distributed, redundant work scheduler—A distributed architecture for redundancy and scalability purposes may be used, allowing multiple instances to evaluate dependency constraints and time-based conditions. The distributed architecture may enable scaling out to support higher processing loads, as well as redundancy to avoid disruptions in service in the event that an instance fails unexpectedly.
- Automatic load balancing—A shared queue, just-in-time processing model may be used. When an instance has available capacity, it may check the shared queue for work items ready for processing.
- Auto-recovery—Automatically retrying to execute a work item may be done if it does not complete successfully.

FIG. 1 illustrates a method for generating a financial market data snapshot, according to an embodiment of the invention. In 105, financial market data elements are received from a plurality of sources. In 110, workflows are determined, where each workflow processes a separate financial market data element. In 115, Dependencies linking workflows with each other are determined. In 120, When one or more dependency conditions are met, the linked workflows are processed. In 125, the financial market data snapshot is generated using processed workflows.

For example, in 105, generating snapshots of end-of-day prices on US exchanges may require incorporating data from the following data sources:

- 4 pm Eastern snapshot of last trade prices from NYSE and NASDAQ.
- Revised closing prices within 2 hours 4 pm Eastern market close.
- Daily security master files from Vendor 2

Daily files from Vendor 1 containing sector and industry classifications.

Daily corporate action files from Vendor 3

SEC financial statement filings

In 110, the workflows can be determined. Each workflow can process a separate financial market data element. In 115, dependencies linking workflows with each other are determined. In 120, when dependencies are met, linked workflows can be processed. In 125, the financial market data snapshot, such as the one illustrated in FIG. 4 can be generated.

Figure 2:
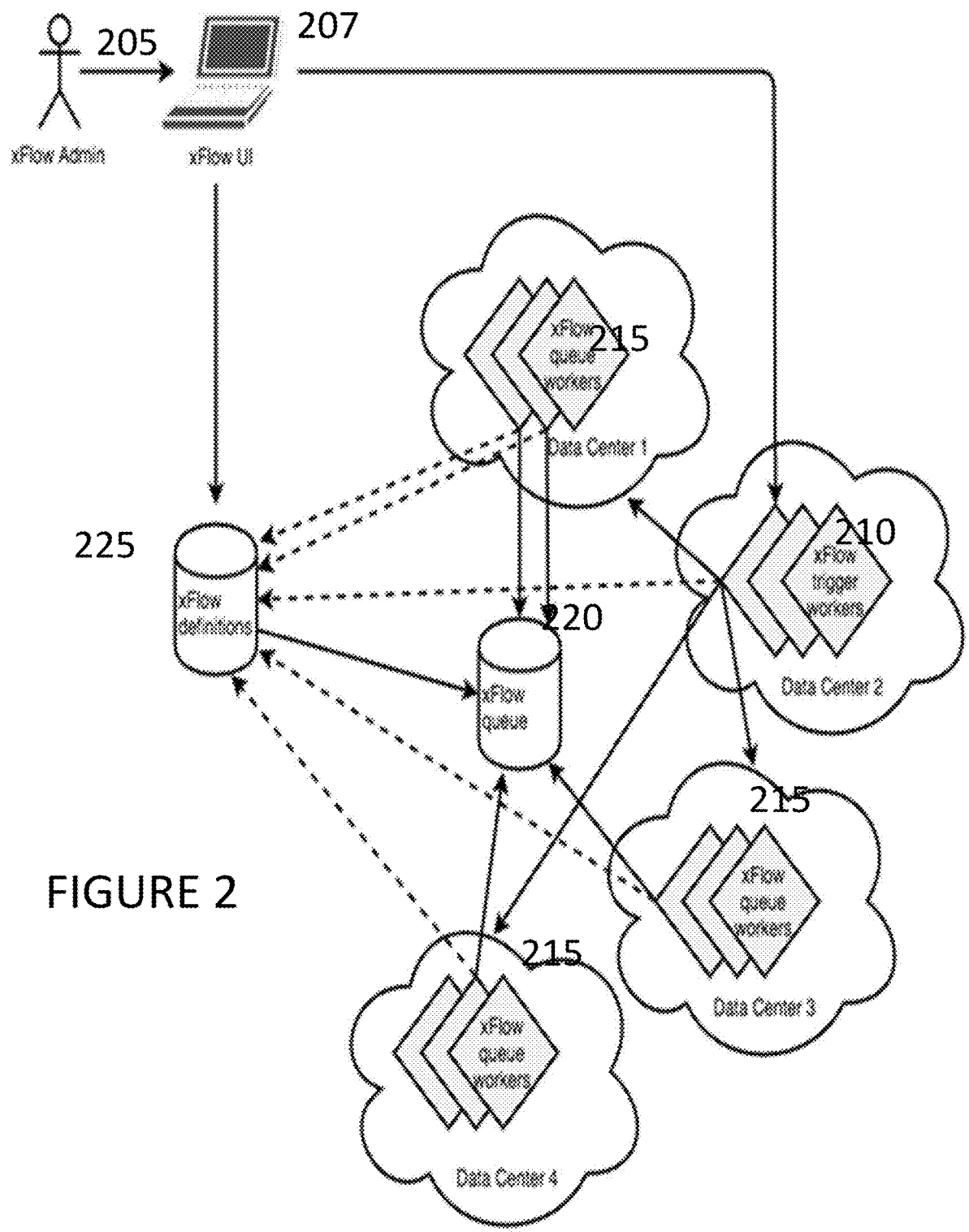
FIG. 2 illustrates a system diagram, according to an embodiment of the invention.

FIG. 2 illustrates an administrator 205 who can use the snapshot application to define and maintain workflows, which can be stored in the definitions database 210. Each workflow can identify at least one of the following: (a) Conditions necessary to invoke a workflow (e.g., at least one of: the existence of a file, a scheduled time, and/or a trigger); (b) Processes that the workflow invokes (e.g., at least one of: an executable, a registered subroutine, and/or a workflow); and (c) Auto-recovery options (e.g., at least one of: after a maximum number of retries, upon failure, after a maximum allowable elapsed time, and/or after not receiving a heartbeat for a maximum allowable elapsed time).

In some embodiments, the system itself can be defined as a workflow. The administrator 205 can configure the system by revising this workflow. For example, the workflow can comprise at least one of: a trigger process and/or a queue workers process. For example, the administrator 205 can define one or more triggers (e.g., conditions being met that indicate that all relevant data to generate the snapshot has been received). The User Interface (UI) 207 can thus send a message to a trigger workers module 210 (e.g., in Data Center 2 (e.g., in Oregon)) when necessary conditions are met to invoke one or more workflows. For example, if all the conditions have been met that indicate that all data needed to generate the snapshot has been received, the UI 207 can send a message to the trigger workers module 210 indicating that the workers can begin processing the workflows, Note that in some embodiments, different information needed to generate a particular workflow or several but not all workflows can be separately triggered without waiting for all necessary information for the snapshot, such that fewer workflows remain to be processed when the final information comes in that is needed to provide a complete snapshot.

Once the trigger workers module 210 receives information indicating that one or more workflows can be invoked (e.g., because the necessary conditions have been met), the trigger workers module 210 can send information to queue workers modules 215, which may be located in several data centers (e.g., in Data Centers 1 (e.g., in Virginia), 3 (e.g., in Singapore), and 4 (e.g., in Ireland)), indicating that the worker modules can reach out to the queue database 220 to ask to be assigned workflows to process. In some embodiments, an auto-recovery process can be invoked after a certain number of retries (e.g., three) to invoke the queue workers process.

The worker modules can access the definition database 225 as needed to complete their assigned workflows. Because the workflows are done in multiple data centers, redundancy and distribution are built into the method, so that if a data center is not functional, the snapshot can still be triggered. In addition, because multiple data centers are used to generate the snapshot, in some embodiments, no data centers will likely be overwhelmed by the data processing required to generate the snapshot. Although the trigger workers module 210 is shown in FIG. 2 as residing at a different data center than the queue workers modules 215, in some embodiments, the trigger workers module(s) 210 and the queue workers module(s) 215 can reside at the same data center In some embodiments, the system can populate the queue database 220 with workflows scheduled to run at specific times. The queue workers module 210 can poll the queue database 220 for workflows that are ready for processing (e.g., based on a scheduled time that has passed). In some embodiments, only one queue worker can execute an available workflow, based on a first-come, first-serve model. A queue worker can do any or all of the following: poll the queue database 220 for an available workflow; validate the conditions necessary to invoke that workflow; lock the workflow in the queue database 220 for processing; invoke the process associated with that workflow; and/or update the queue database 220 when the process has completed.

Figure 3:
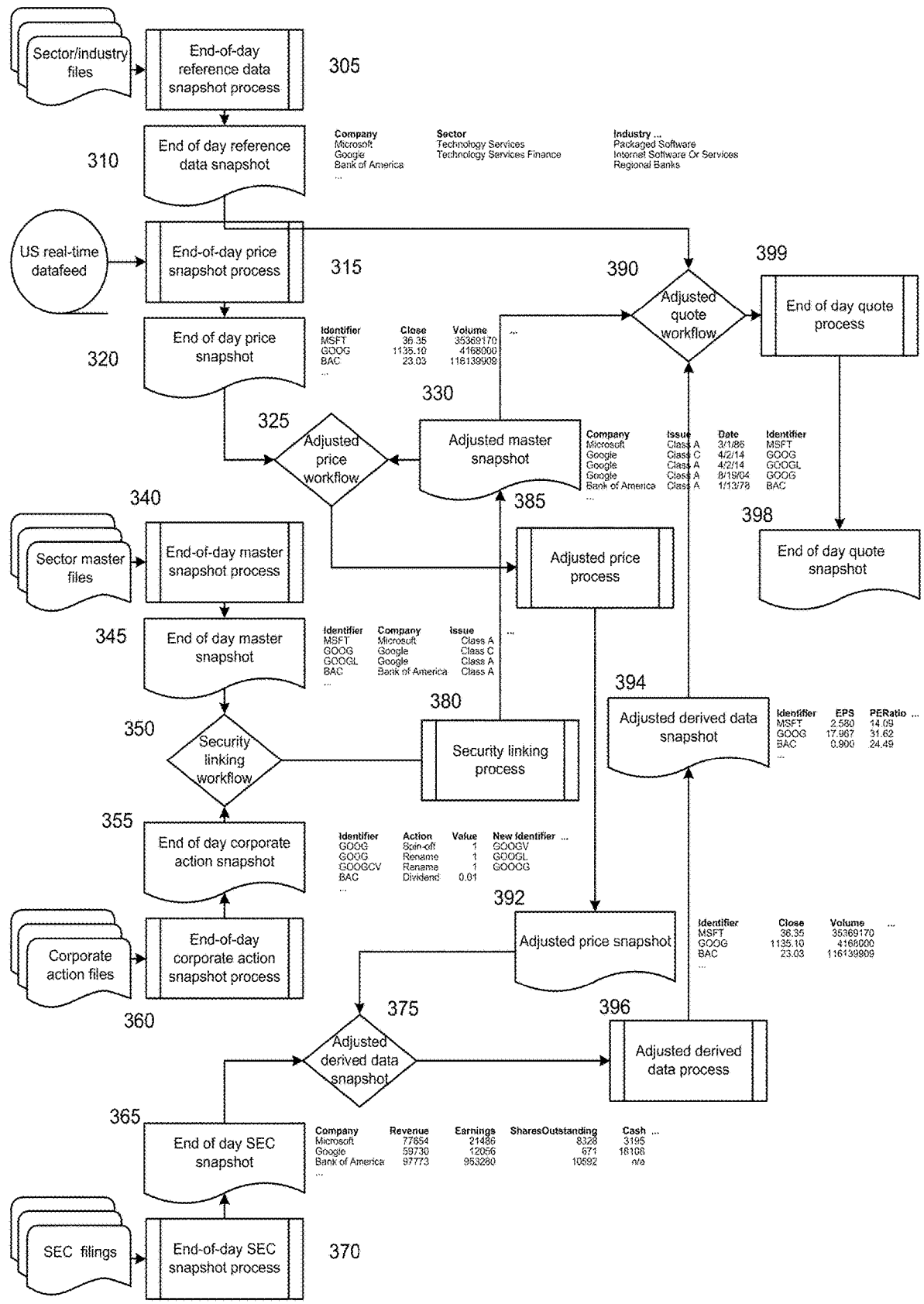
FIG. 3 illustrates an example of how data can be used in creating a snapshot, according to an embodiment of the invention.

FIG. 3 illustrates an example of how data can be used in creating a snapshot, according to an embodiment. In 305, company, reference data (e.g., such as company, sector and/or industry files) can be used in an end-of-day reference data snapshot process to create an end of day reference data snapshot 310. Company files can include files from companies such as Microsoft, Google, Bank of America, etc. Sector files can include files from a technology services sector, a finance services sector, etc. Industry files can include files from a packaged software industry, an Internet software or services industry, regional banks, etc.

In 315, US real-time data can be used in an end-of-day price snapshot process to generate an end-of-day price snapshot 320. For example, identifier information (e.g., MSFT, GOOG, BAC), close price information (e.g., 36.35, 1135.10, 23.03) and/or volume information (e.g., 35369170, 4158000, 116139909) can be used for each of the companies Microsoft®, Google®, and Bank of America®.

In 340, sector master file information can be used in an end-of-day master snapshot process to create an end-of-day master snapshot 345. For example, identifier information (e.g., MSFT, GOOG, GOOGL, BAC), company name (e.g., Microsoft®, Google®, Google®, Bank of America®), and/or issue information (e.g., class A, class C, class A, class A) can be used.

In 360, corporate action files can be used in an end-of-day corporate action snapshot process to create an end-of-day corporate action snapshot 355. For example, identifier information (e.g., GOOG, GOOG, GOOGCB, BAC), action information (e.g., spin-off, rename, rename, dividend), value (e.g., 1, 1, 1, 0.01), and/or new identifier information (e.g, GOOGV, GOOGL, GOOOG) can be used.

In 370, SEC filing information can be used in an end-of-day SEC snapshot process 370 to create an end-of-day SEC snapshot 365. For example, company name (e.g., Microsoft®, Google®, Bank of America®), revenue information (77654, 59730, 97773), earnings information (e.g., 21486, 12056, 953280) and/or outstanding share information (e.g., 8328, 671, 10592) can be utilized.

FIG. 4 illustrates an excerpt of an end-of-day snapshot file for NYSE securities:

Date—From the End of day price snapshot.

Symbol—Actual symbols from the US real-time data feed are translated to the Symbols in this file from the End of day master snapshot.

Exchange—From a source not shown in the workflow diagram—An industry-standard exchange code from any source from a lookup table for exchanges.

Currency/DividendCurrency—From a source not shown in the workflow—we assign an industry-standard currency code from a lookup table for exchanges.

Open/High/Low/LastNolume—From the Adjusted price snapshot.

SplitRatio/CashDividend—From the End of day corporate action snapshot.

The end of day reference data snapshot 310 can be used in an adjusted quote workflow 390. The end-of-day price snapshot 320 can be used in an adjusted price workflow 325. The end-of-day master snapshot 345 and the end-of-day corporate action snapshot 355 can be used in a security linking workflow 350. The end-of-day SEC snapshot can be used in an adjusted derived data snapshot 375.

Example Use Case

Three components may be included in embodiments of the invention: Database, MessageBus and FlowWorkers. Database can contain WorkFlowDefinitions and individual WorkFlowItems. MessageBus can comprise a generic message bus for FlowWorkers to send/receive WorkFlow. FlowWorkers can comprise a property partition which can define which partition of MessageBus it can pick up WorkFlows from. A FlowWorker can pick up a WorkFlow of the same Partition from MessageBus, make it invisible to other FlowWorkers and work on it.

MessageBus. MessageBus can be any generic message bus that supports multiple publishers/subscribers and message partitions.

Database. Database can be any database. A table can be created for WorkFlowDefinitions and/or for WorkFlowItems. For example, the table for WorkFlowDefinitions can be:

| Columns: | |
|---|---|
| ID (Can be a unique ID of the WorkFlowDefinition) | |
| Name | Friendly name of the WorkFlowDefinition |
| IsEnabled | Is enabled |
| DateScheduled | Start date |
| TimeZone | Time zone |
| TimeDelay | Start time |
| Frequency | Recurring WorkFlow frequency in seconds. 0 means one time WorkFlow. |
| Partition | MessageBus partition |
| TimeSpanWindow | The time range to schedule WorkFlows. For example, from 3 days ago to now. |
| MaxAttempts | Maximum number of attempts before giving up. |
| Timeout | Timeout value of each WorkFlow execution. |
| RetryWaitPeriod | Wait time before next retry. |
| WorkflowType | Scheduler, EndOfDay |
| Parameters | Parameters of the Workflow |
| Dependencies | The existence of a file or the completion of another WorkFlow. |
| Version | Version of the WorkFlowDefinition |

The table for WorkFlowItems can be:

| Columns: | |
|---|---|
| ID (Unique ID of the Workstem) | |
| WorkDefinitionId | Id of WorkFlowDefinition |
| TimestampScheduled | The scheduled time for the WorkItem |
| TimestampSubmitted | The time the WorkItem is created |
| TimestampStart | The time when a FlowWorker starts working on the WorkItem |
| TimestampEnd | The time when a FlowWorker finishes working on the WorkItem |
| State | Scheduled, Started or Completed |
| Result | None, Success, Failure or Aborted |

-continued

| Columns: | |
|---|---|
| ID (Unique ID of the Workstem) | |
| Attempt | The number of attempts |
| Message | Any output message from FlowWorker |

Each FlowWorker can do the following:
1. Pick up a WorkFlow of the same Partition from MessageBus.
2. Use the WorkFlow ID to get corresponding WorkFlowItem from Database.
3. Use the WorkFlowItem.WorkDefinitionId to get corresponding WorkFlowDefinition from Database.
4. Perform actual work based on WorkFlowDefinition.
5. Update WorkFlowItem (State, Result, etc) in Database.

The actual work (#4) can vary for different types of WorkFlows. The following examples of FlowWorkers demonstrates how XigniteFlow can be used in some embodiments.

Scheduler FlowWorker. Scheduler FlowWorker can be a separate tool that can add a new Scheduler WorkFlow to MessageBus periodically. In some embodiments, it can perform some or all of the following procedures:
1. Pick up a Scheduler WorkFlow from MessageBus.
2. Use the WorkFlow ID to get corresponding WorkFlowItem from Database.
3. Use the WorkFlowItem.WorkDefinitionId to get corresponding WorkFlowDefinition from Database.
4. Perform actual work which is to manage WorkFlowItems for all other WorkFlows.
   a. For each WorkFlowDefinition, create WorkFlowItem if all the following conditions are met.
      i. The TimeSpanWindow contains scheduled time to run (determined by WorkFlowDefinition DateScheduled, TimeDelay, TimeZone and Frequency) but WorkFlowItem for that scheduled time has not been created yet.
      ii. For each defined dependency on a file, the file exists.
      iii. For each defined dependency on another WorkFlow schedule to run at certain time, the WorkFlow has been completed successfully.
   b. For each WorkFlowItem with TimestampScheduled in a configured range, State Started and the elapsed time between WorkFlowItem.TimeStampStart and now is more than WorkFlowDefinition.Timeout, set the WorkFlowItem State to Completed and Result to Aborted in Database. Create a new WorkFlowItem with same configuration and Attempt incremented by 1.
   c. For each WorkFlowItem with TimestampScheduled in a configured range, State Completed and Result Failure, create a new WorkFlowItem with same configuration and Attempt incremented by 1.
   d. For each created WorkFlowItem, add a WorkFlow message with the WorkFlowItem Id to corresponding MessageBus partition.
5. Update the current Scheduler WorkFlowItem as Completed with Success.

Single-source Snapshot FlowWorker. Single-source Snapshot FlowWorker can generate single-source snapshot files such as an end-of-day reference data snapshot, an end-of-day price snapshot, an end-of-day master snapshot, an end-of-day corporate action snapshot, an end-of-day SEC snapshot, etc. In some embodiments, it can perform some or all of the following procedures:
1. Pick up a Single-source Snapshot WorkFlow from MessageBus.
2. Use the WorkFlow ID to get corresponding WorkFlowItem from Database.
3. Use the WorkFlowItem.WorkDefinitionId to get corresponding WorkFlowDefinition from Database.
4. Perform actual work which is to generate single-source snapshot file based on WorkFlowDefinition and Parameters, including
   a. Source of data (realtime price feed, security master database, corporate action database, etc)
   b. How to get the data (stored procedure or service call)
   c. Which exchange
   d. Format of output snapshot file
   e. Location of output snapshot file
5. Update the current WorkFlowItem (State, Result, Message, etc) in Database.

Multi-source Snapshot FlowWorker. Multi-source Snapshot FlowWorker can generate multi-source snapshot files using a combination of single-source snapshots. In some embodiments, it can perform some or all of the following procedures:
1. Pick up a multi-source Snapshot WorkFlow from MessageBus.
2. Use the WorkFlow ID to get corresponding WorkFlowItem from Database.
3. Use the WorkFlowItem.WorkDefinitionId to get corresponding WorkFlowDefinition from Database.
4. Perform actual work which is to generate Multi-source Snapshot file based on WorkFlowDefinition and Parameters, including
   a. The Single-source snapshot files to use
   b. The logic to combine multiple single-source snapshot files
   c. Which exchange
   d. Format of output snapshot file
   e. Location of output snapshot file
5. Update the current WorkFlowItem (State, Result, Message, etc) in Database.

CONCLUSION

While the disclosure has been described with reference to numerous specific details, one of ordinary skill in the art will recognize that the disclosure can be embodied in other specific forms without departing from the spirit of the disclosure. In addition, a number of the figures illustrate processes. The specific operations of these processes may not be performed in the exact order shown and described. The specific operations may not be performed in one continuous series of operations, and different specific operations may be performed in different embodiments. Thus, one of ordinary skill in the art would understand that the invention is not to be limited by the illustrative details, but rather is to be defined by the appended claims.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the terms "including", "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

What is claimed is:

1. A method for automatically generating a financial market snapshot comprising:
    performing processing associated with receiving, on at least one processor of at least one server comprising the at least one processor, at least one message bus, and at least one database, a plurality of financial market data elements from a plurality of sources, the at least one database comprising workflow definitions and individual workflow items, and the at least one message bus supporting multiple publishers and/or subscribers;
    performing processing associated with determining by the at least one message bus, with the at least one processor, workflows selected from a plurality of workflows in the at least one database, each workflow being selected for processing a separate one of the plurality of financial market data elements;
    performing processing associated with creating at least one workflow item if all workflow conditions are met but the at least one workflow item has not been created yet;
    performing processing associated with determining, with the at least one processor, a plurality of dependencies linking the workflows for each source with one another, each dependency comprising dependency conditions, the dependency conditions comprising: at least one existence of a file and/or at least one completion of another workflow;
    in response to the dependency conditions being met, automatically performing processing associated with processing, with the at least one processor, at least one workflow linked to at least one dependency for which the dependency conditions for each source are met, wherein the dependency conditions comprise: a time span window containing a scheduled time to run, existence of predefined dependency files, or completion of predefined dependent workflows, or any combination thereof; and
    performing processing associated with generating, with the at least one processor, the financial market end of day snapshot from the plurality of sources as a result of the processing of the at least one workflow, wherein the at least one workflow item has time-based conditions and/or dependency constraints.

2. The method of claim 1, wherein at least one of the workflows further comprises a time-based constraint.

3. The method of claim 2, wherein the processing of the at least one workflow is performed in response to the time-based constraint being met in addition to the dependency conditions being met.

4. The method of claim 1, wherein:
each workflow comprises one or more work items; and
the processing of the at least one workflow comprises processing the one or more work items of the at least one workflow.

5. The method of claim 1, wherein the at least one server comprises a plurality of distributed servers each comprising at least one processor and the at least one database.

6. The method of claim 5, wherein the processing associated with determining the workflows, determining the plurality of dependencies, processing the at least one workflow, or generating the financial market snapshot, or a combination thereof is performed redundantly.

7. The method of claim 5, wherein the processing associated with at least one of: determining the workflows, determining the plurality of dependencies, processing the at least one workflow, and generating the financial market snapshot, is performed by separate servers in a distributed fashion.

8. The method of claim 1, further comprising:
performing processing associated with detecting, with the at least one processor, an error in the processing associated with at least one of:
determining the workflows,
determining the plurality of dependencies,
processing the at least one workflow, and
generating the financial market snapshot; and
in response to the detecting, performing processing associated with automatically retrying, with the at least one processor, the processing in which the error is detected.

9. The method of claim 1, wherein at least one scheduler is implemented as the at least one workflow item.

10. The method of claim 9, wherein workflow scheduling is: distributed, fault-tolerant, auto-recovery, or autoload balancing, or any combination thereof.

11. A system for automatically generating a financial market snapshot comprising:
at least one server comprising at least one processor, wherein the at least one processor is configured to perform processing associated with:
performing processing associated with receiving, on at least one processor of at least one server comprising the at least one processor, at least one message bus, and at least one database, a plurality of financial market data elements from a plurality of sources, the at least one database comprising workflow definitions and individual workflow items, and the at least one message bus supporting multiple publishers and/or subscribers;
performing processing associated with determining by the at least one message bus, with the at least one processor, workflows selected from a plurality of workflows in the at least one database, each workflow being selected for processing a separate one of the plurality of financial market data elements;
performing processing associated with creating at least one workflow item if all workflow conditions are met but the at least one workflow item has not been created yet;
performing processing associated with determining, with the at least one processor, a plurality of dependencies linking the workflows for each source with one another, each dependency comprising dependency conditions, the dependency conditions comprising: at least one existence of a file and/or at least one completion of another workflow;
in response to the dependency conditions being met, automatically performing processing associated with processing, with the at least one processor, at least one workflow linked to at least one dependency for which the dependency conditions for each source are met, wherein the dependency conditions comprise: a time span window containing a scheduled time to run, existence of predefined dependency files, or completion of predefined dependent workflows, or any combination thereof; and
performing processing associated with generating, with the at least one processor, the financial market end of day snapshot as a result of the processing of the at least one workflow, wherein the at least one workflow item has time-based conditions and/or dependency constraints.

12. The system of claim 11, wherein at least one of the workflows further comprises a time-based constraint.

13. The system of claim 12, wherein the at least one processor is configured to workflow in response to the time-based constraint being met in addition to the dependency conditions being met.

14. The system of claim 11, wherein:
each workflow comprises one or more work items; and
the processing of the at least one workflow comprises processing the one or more work items of the at least one workflow.

15. The system of claim 11, wherein the at least one server comprises a plurality of distributed servers each comprising at least one processor and the at least one database.

16. The system of claim 15, wherein processors of the plurality of distributed servers are configured to redundantly perform processing associated with determining the workflows, determining the plurality of dependencies, processing the at least one workflow, or generating the financial market snapshot, or a combination thereof.

17. The system of claim 15, wherein processors of separate ones of the distributed servers are configured to perform, in a distributed fashion, the processing associated with at least one of: determining the workflows, determining the plurality of dependencies, processing the at least one workflow, and generating the financial market snapshot.

18. The system of claim 11, wherein the at least one processor is further configured to perform processing associated with:
detecting an error in the processing associated with at least one of:
determining the workflows,
determining the plurality of dependencies,
processing the at least one workflow, and
generating the financial market snapshot; and
in response to the detecting, automatically retrying the processing in which the error is detected.

19. The system of claim 11, wherein the at least one workflow definition and at least one workflow item status are kept in the database.

20. The system of claim 19, wherein the at least one message bus is used to send and/or receive workflow items.

* * * * *